(12) United States Patent
You et al.

(10) Patent No.: US 12,183,930 B2
(45) Date of Patent: Dec. 31, 2024

(54) LITHIUM SECONDARY BATTERY AND PRODUCTION METHOD THEREOF

(71) Applicant: LG Chem, Ltd., Seoul (KR)

(72) Inventors: Min Kyu You, Daejeon (KR); Kyung Lok Lee, Daejeon (KR); Ji A Shin, Daejeon (KR); Sang Soon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 742 days.

(21) Appl. No.: 17/422,583

(22) PCT Filed: Jan. 16, 2020

(86) PCT No.: PCT/KR2020/000829
§ 371 (c)(1),
(2) Date: Jul. 13, 2021

(87) PCT Pub. No.: WO2020/149679
PCT Pub. Date: Jul. 23, 2020

(65) Prior Publication Data
US 2022/0102731 A1    Mar. 31, 2022

(30) Foreign Application Priority Data
Jan. 16, 2019 (KR) .................. 10-2019-0005688

(51) Int. Cl.
*H01M 4/66* (2006.01)
*H01M 4/02* (2006.01)
(Continued)

(52) U.S. Cl.
CPC ......... *H01M 4/661* (2013.01); *H01M 4/0435* (2013.01); *H01M 10/0525* (2013.01);
(Continued)

(58) Field of Classification Search
CPC ...... H01M 4/0435; H01M 4/661; H01M 4/70; H01M 2004/021; H01M 10/0525
See application file for complete search history.

(56) References Cited

U.S. PATENT DOCUMENTS

| | | |
|---|---|---|
| 2012/0034510 A1 | 2/2012 | Kitaura |
| 2012/0082898 A1 | 4/2012 | Takahashi et al. |
| | (Continued) | |

FOREIGN PATENT DOCUMENTS

| | | |
|---|---|---|
| CN | 102447134 A | 5/2012 |
| CN | 103262307 A | 8/2013 |
| | (Continued) | |

OTHER PUBLICATIONS

International Search Report for Application No. PCT/KR2020/000829 mailed May 6, 2020, pp. 1-2.
(Continued)

*Primary Examiner* — Brittany L Raymond
(74) *Attorney, Agent, or Firm* — Lerner David LLP (57) ABSTRACT

A lithium secondary battery is disclosed herein. In some embodiments, a lithium secondary battery includes: a battery case having an interior region, a separator, wherein the separator divides the interior region into a first region and a second region, a positive electrode formed in the first region and including a positive electrode active material and positive electrode current collector particles; and a negative electrode formed in the second region and including a negative electrode active material and negative electrode current collector particles.

15 Claims, 3 Drawing Sheets

(51) Int. Cl.
  *H01M 4/04*    (2006.01)
  *H01M 10/0525*    (2010.01)
  *H01M 50/105*    (2021.01)

(52) U.S. Cl.
  CPC  *H01M 2004/021* (2013.01); *H01M 2004/027* (2013.01); *H01M 2004/028* (2013.01); *H01M 50/105* (2021.01)

(56) References Cited

U.S. PATENT DOCUMENTS

| | | |
|---|---|---|
| 2013/0266834 A1 | 10/2013 | Sawa et al. |
| 2014/0295273 A1 | 10/2014 | Mah et al. |
| 2017/0104204 A1 | 4/2017 | Zhamu et al. |
| 2018/0287202 A1* | 10/2018 | Matsushita ............ H01M 4/366 |
| 2019/0207200 A1 | 7/2019 | Zhamu et al. |
| 2019/0221881 A1* | 7/2019 | You .................... H01M 4/04 |
| 2022/0045311 A1 | 2/2022 | Zhamu et al. |

FOREIGN PATENT DOCUMENTS

| | | |
|---|---|---|
| CN | 108140843 A | 6/2018 |
| JP | H10144325 A | 5/1998 |
| JP | 2001223029 A | 8/2001 |
| JP | 2004281418 A | 10/2004 |
| JP | 2007141527 A | 6/2007 |
| JP | 2009193802 A | 8/2009 |
| JP | 2011187270 A | 9/2011 |
| JP | 2012190809 A | 10/2012 |
| JP | 2016134296 A | 7/2016 |
| JP | 2017004946 A | 1/2017 |
| JP | 2018185933 A | 11/2018 |
| KR | 19990013208 U | 4/1999 |
| KR | 20060102745 A | 9/2006 |
| KR | 2009-0104991 | * 10/2009 |
| KR | 20090104991 A | 10/2009 |
| KR | 20110100114 A | 9/2011 |
| KR | 2012-0013901 A | 2/2012 |
| KR | 20120131308 A | 12/2012 |
| KR | 20130123492 A | 11/2013 |
| KR | 20140117205 A | 10/2014 |
| KR | 101506319 B1 | 3/2015 |
| KR | 20160053849 A | 5/2016 |
| KR | 20160079508 A | 7/2016 |
| KR | 101664826 B1 | 10/2016 |
| KR | 2018-0063061 A | 6/2018 |
| KR | 20180113417 A | 10/2018 |
| WO | 2017057078 A1 | 4/2017 |
| WO | 2018186597 A1 | 10/2018 |
| WO | WO 2018-186597 | * 10/2018 |

OTHER PUBLICATIONS

Extended European Search Report and the European search opinion for corresponding European Patent Application No. 20740822.0 dated Jan. 10, 2022, 8 pgs.

Search report dated Jan. 5, 2024 from the Office Action for Chinese Application No. 202080008759.8 issued Jan. 8, 2024. 4 pages.

* cited by examiner

LITHIUM SECONDARY BATTERY AND PRODUCTION METHOD THEREOF

CROSS-REFERENCE TO RELATED APPLICATION

The present application is a national phase entry under 35 U.S.C. § 371 of International Application No. PCT/KR2020/000829, filed on Jan. 16, 2020, which claims priority from Korean Patent Application No. 10-2019-0005688, filed on Jan. 16, 2019, the disclosures of which are incorporated by reference herein.

TECHNICAL FIELD

The present invention relates to a lithium secondary battery and a production method thereof.

BACKGROUND ART

Recently, in response to the rapid spread of electronic devices using batteries, such as mobile phones, notebook computers, and electric vehicles, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

The lithium secondary battery is a device that produces electricity by the electrochemical reaction between positive and negative electrodes, and the electrodes were conventionally produced by coating an electrode current collector layer with an electrode slurry including an electrode active material, a conductive material, a binder, and the like, followed by rolling and drying.

Meanwhile, as demand for high capacity, high output, and low cost lithium secondary batteries has recently increased, there is a need to increase the amount of the electrode active material loaded in the battery. However, when the electrode is produced by the conventional process as described above, there are concerns about an increase in battery defects caused by carrying out a variety of processes such as coating, rolling, drying, and the like, an imbalance of an loading amount of an electrode active material, and an adhesion defect of an electrode active material layer and a current collector layer according to the limitation of the process. In addition, the conventional process is problematic because a phenomenon in which the output characteristics of the battery are rapidly degraded due to a distance between a current collector layer and the top of an electrode active material layer occurs.

Korean Laid-Open Patent Publication No. 10-2016-0053849 discloses a positive electrode active material and a secondary battery including the same.

PRIOR-ART DOCUMENTS

Patent Documents

Korean Laid-Open Patent Publication No. 10-2016-0053849

DISCLOSURE

Technical Problem

The present invention is directed to providing a lithium secondary battery which is capable of achieving high capacity and high energy density by using, as a current collector, current collector particles instead of the conventional plate-type current collector.

The present invention is also directed to providing a method of producing a lithium secondary battery which allows the process to be simplified and productivity to be improved by omitting a coating process for forming an active material layer which is essential in the conventional electrode production process.

Technical Solution

One aspect of the present invention provides a lithium secondary battery which includes: a battery case whose inside (an interior region) is divided into one region (a first region) and the other region (a second region) by a separator; a positive electrode formed in the one region inside the battery case and including a positive electrode active material and positive electrode current collector particles; and a negative electrode formed in the other region inside the battery case and including a negative electrode active material and negative electrode current collector particles.

Another aspect of the present invention provides a method of producing a lithium secondary battery, which includes: providing a battery case whose inside is divided into one region and the other region by a separator; preparing a first mixture including a positive electrode active material and positive electrode current collector particles and preparing a second mixture including a negative electrode active material and negative electrode current collector particles; injecting the first mixture into the one region inside the battery case and injecting the second mixture into the other region inside the battery case; and rolling the battery case into which the first mixture and the second mixture have been injected while applying pressure.

Advantageous Effects

According to a lithium secondary battery of the present invention, since current collector particles are distributed among electrode active materials, the conventional problem such as output reduction caused by an increase in a distance between a current collector layer and the top of an electrode active material layer can be solved.

In addition, according to the lithium secondary battery of the present invention, since a current collector in the form of particles is used instead of the conventional current collector layer, an electrode having high capacity and high energy density based on the same thickness, as compared with the conventional electrode produced by a coating method, can be produced.

Additionally, according to a method of producing a lithium secondary battery of the present invention, a process of mixing current collector particles rather than the conventional plate-type current collector with an electrode active material and then injecting the resulting mixture into a battery case is carried out. That is, since a process of applying an electrode active material onto an electrode current collector layer is not carried out, a battery production process can be simplified.

In addition, according to the method of producing a lithium secondary battery of the present invention, since a positive electrode and a negative electrode can be produced integrally in a battery case, a process of producing a positive electrode and a negative electrode as separate units and then assembling the units is not required. Accordingly, the method of producing a lithium secondary battery of the present invention can allow a battery production process to be simplified and productivity to be improved.

MODES OF THE INVENTION

Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprising", "including", and/or "having", when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

Hereinafter, the present invention will be described in detail.

<Lithium Secondary Battery>

Hereinafter, the present invention will be described in detail with reference to the accompanying drawings. Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

Therefore, since embodiments described in this specification and configurations illustrated in drawings are only exemplary embodiments and do not represent the overall technological scope of the invention, it should be understood that the invention covers various equivalents, modifications, and substitutions at the time of filing of this application.

Figure 1:
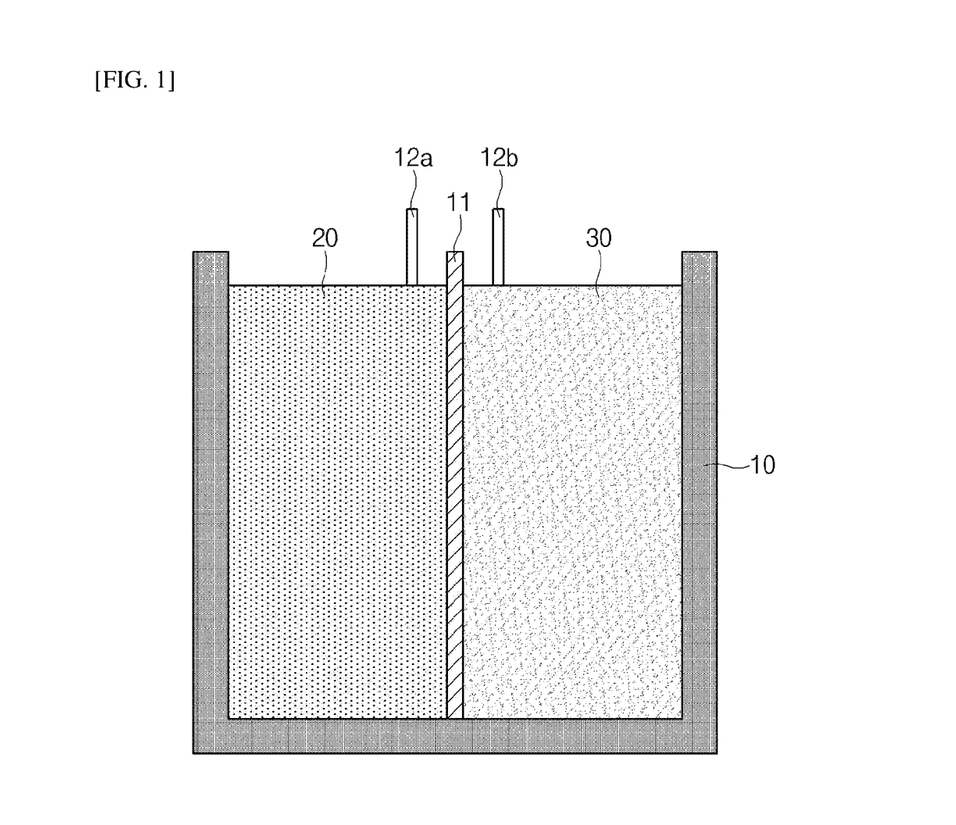
FIG. 1 is a schematic diagram for describing a lithium secondary battery of the present invention.

FIG. 1 is a schematic diagram for describing a lithium secondary battery of the present invention.

Referring to FIG. 1, a lithium secondary battery of the present invention includes: a battery case 10 whose inside (an interior region) is divided into one region (a first region) and the other region (a second region) by a separator 11; a positive electrode 20 formed in one region inside the battery case 10 and including a positive electrode active material and positive electrode current collector particles; and a negative electrode 30 formed in the other region inside the battery case 10 and including a negative electrode active material and negative electrode current collector particles.

In the case of the conventional electrode consisting of a current collector layer and an electrode active material layer, since the current collector layer is provided at a bottom of an electrode, a distance between an electrode active material present at a top of an electrode active material layer and a current collector layer increases, resulting in output reduction and resistance increase. On the other hand, in the case of the lithium secondary battery of the present invention, since a current collector in the form of particles rather than a plate is mixed with an electrode active material, the electrode active material and current collector particles may be in uniform contact with each other in the electrode, which is favorable for improving output characteristics of the battery and reducing resistance.

In addition, according to the lithium secondary battery of the present invention, since a current collector in the form of particles is used instead of a current collector in the form of a plate, it is possible to produce an electrode having high capacity and high energy density based on the same thickness, as compared with the conventional electrode.

The battery case 10 is provided to serve as an exterior material of the produced battery, and any battery case used in a common lithium secondary battery may be used without limitation. Specifically, the battery case 10 may be in the form of a pouch or can, and more specifically, in the form of an aluminum pouch or can.

The battery case 10 may include a coating layer including a non-conductive material therein for insulation from the outside of the case.

The inside of the battery case 10 may be divided into one region and the other region by the separator 11. The separator 11 may serve to separate a negative electrode and a positive electrode so as to prevent a short circuit and provide a passage for lithium ion migration.

The separator 11 separates one region and the other region inside the battery case 10 as shown in FIG. 1, and one region and the other region inside the battery case 10 may be provided as places where a positive electrode and a negative electrode are formed, respectively.

As the separator 11, any separator commonly used in the art may be used without limitation. As the separator 11, a separator that exhibits low resistance to the migration of electrolyte ions and has an excellent electrolyte impregnation ability is preferred, and a porous polymer film, for example, a porous polymer film made of a polyolefin-based polymer such as an ethylene polymer, a propylene polymer, an ethylene/butene copolymer, an ethylene/hexene copolymer, an ethylene/methacrylate copolymer, or the like or a stacked structure having two or more layers thereof may be used. In addition, as the separator 11, a common porous non-woven fabric, for example, a non-woven fabric made of high-melting-point glass fiber, polyethylene terephthalate fiber, or the like may be used. Additionally, in order to ensure heat resistance or mechanical strength, a coated separator which includes a ceramic component or polymer material and is optionally in a single-layer or multi-layer structure may be used as the separator 11.

The battery case 10 may further include a mesh-type current collector. The mesh-type current collector may be provided as an additional current collector for positive electrode current collector particles and negative electrode current collector particles which are to be described below and may serve to, along with the positive electrode current collector particles and negative electrode current collector particles realize an effect of improving conductivity and adhesion to a positive electrode active material/negative electrode active material.

The mesh-type current collector may have a single-layer structure in view of increasing the loading amount of a positive electrode active material or negative electrode active material and realizing high energy density. Specifically, the mesh-type current collector may have a thickness of 10 nm to 50 nm, and preferably, 20 nm to 40 nm.

The battery case 10 may further include a positive electrode tab 12a and a negative electrode tab 12b for transferring generated electrons to the outside. The positive electrode 20 is formed in one region inside the battery case 10 and includes a positive electrode active material and positive electrode current collector particles.

The positive electrode active material may include a compound enabling the reversible intercalation and deintercalation of lithium, specifically, a lithium composite metal oxide including lithium and one or more types of metals such as cobalt, manganese, nickel, and aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$), $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{S2})O_2$ (where M is selected from the group consisting of Al, Fe, V, Cr, Ti, Ta, Mg, and Mo, and p2, q2, r3, and s2 are respective atomic fractions of elements which are independent of one another, and $0<p2<1$, $0<q2<1$, $0<r3<1$, $0<s2<1$, $p2+q2+r3+s2=1$), etc.), which may be used alone or in combination of two or more thereof. Among those listed above, in view of increasing the capacity characteristic and stability of the battery, the lithium composite metal oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.). In addition, considering that the types and content ratio of elements constituting the lithium composite metal oxide are controlled to realize a remarkable improvement effect, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, which may be used alone or in combination of two or more thereof.

The positive electrode active material may be included at 80 wt % to 98 wt %, preferably 82 wt % to 94 wt %, and more preferably 87 wt % to 91 wt % in the positive electrode 20. It is preferable that the content of the positive electrode active material is within the above-described range in view of improving energy density and output characteristics.

The positive electrode active material may have an average particle diameter ($D_{50}$) of 2 μm to 20 μm, and preferably, 3 μm to 16 μm. It is preferable that the average particle diameter of the positive electrode active material is within the above-described range in that rolling density can be increased to improve energy density.

The positive electrode active material may include a first positive electrode active material and a second positive electrode active material which are different from each other. Specifically, the first positive electrode active material and the second positive electrode active material may have mutually different average particle diameters ($D_{50}$), and the first positive electrode active material may have a larger average particle diameter ($D_{50}$) than the second positive electrode active material. That is, a bimodal positive electrode active material, which is provided by mixing a first positive electrode active material having a large particle diameter and a second positive electrode active material having a small particle diameter, may be used to improve rolling performance and further increase energy density.

The first positive electrode active material may have an average particle diameter ($D_{50}$) of 10 μm to 18 μm, and preferably, 12 μm to 16 μm, and the second positive electrode active material may have an average particle diameter ($D_{50}$) of 2 μm to 8 μm, and preferably, 3 μm to 6 μm. It is preferable that the average particle diameters thereof are within the above-described ranges in that the positive electrode active material can be mixed with current collector particles to be described below so as to improve rolling performance and energy density.

The positive electrode active material may include the first positive electrode active material and the second positive electrode active material in a weight ratio of 60:40 to 90:10, and preferably, 70:30 to 85:15. In this case, the above-described effect of improving rolling density and energy density may be significantly achieved.

The positive electrode 20 includes positive electrode current collector particles.

In the present invention, a current collector in the form of particles rather than a plate is used as a positive electrode current collector or a negative electrode current collector. In the case of a common electrode production process, an electrode is generally produced by loading and applying an electrode active material (positive electrode active material or negative electrode active material) onto a plate-type current collector layer, which leads to problems caused by carrying out the coating process, such as an imbalance of the loading amount of an electrode active material, adhesion defects and output reduction caused by an increase in distance between an electrode active material and a current collector, and the like. However, in the present invention, since a current collector in the form of particles is used such that the current collector particles are mixed with and distributed among electrode active materials, a uniform distance between the electrode active material and the current collector particle may be maintained in the produced lithium secondary battery, and thus problems such as output reduction caused by an increase in distance between the electrode active material and the current collector and binding affinity reduction may be solved. In addition, problems such as an imbalance of the loading amount of the electrode active material and adhesion defects of the electrode active material may be prevented.

In addition, in the present invention, since it is possible to load the electrode active material in a larger amount based on the same volume, as compared with a common electrode produced using a plate-type current collector, a battery having high capacity and high energy density may be produced.

The positive electrode current collector particles may include at least one selected from the group consisting of aluminum, copper, stainless steel, nickel, and titanium and preferably include aluminum in view of improving the stability of the battery in consideration of the oxidation potential of the positive electrode active material.

The positive electrode current collector particles may have an average particle diameter ($D_{50}$) of 0.5 μm to 3 μm, and preferably, 1 μm to 2.5 μm. It is preferable that the average particle diameter of the positive electrode current collector particles is within the above-described range in view of increasing the surface area of the positive electrode current collector in contact with the positive electrode active material and improving rolling density in the mixing of the positive electrode current collector particles with positive electrode active material particles.

The positive electrode current collector particles may be included at 1 wt % to 15 wt %, preferably 1.5 wt % to 13 wt %, and more preferably 4 wt % to 8 wt % in the positive electrode 20. It is preferable that the content of the positive electrode current collector particles is within the above-described range in that a distance between the active material and the current collector can be maintained at a proper level so as to improve the output characteristics of the battery and simultaneously achieve high energy density of the positive electrode active material.

The positive electrode current collector particles may have at least one selected from the group consisting of a spherical shape, a fibrous shape, and a platy shape, preferably at least one selected from the group consisting of a spherical shape and a fibrous shape, and more preferably a spherical shape in view of increasing the surface area of the positive electrode current collector particles in contact with the positive electrode active material.

In the specification, the spherical shape may be understood to encompass not only a completely spherical shape but also a substantially spherical shape. Here, the substantially spherical shape may be understood as a concept that the particle has a substantially spherical or somewhat distorted spherical shape.

The positive electrode 20 may have a porosity of 20% to 30%, preferably 22% to 28%, and more preferably 24.5% to 25.5%. By including the current collector in the form of particles, the positive electrode 20 may have the above-described level of porosity. Accordingly, the positive electrode active material and positive electrode current collector particles may be packed to a superior level, and pores inside the positive electrode may be reduced, thereby improving electrical connection between positive electrode active materials. When the positive electrode includes a current collector in the form of a mesh rather than particles as the positive electrode current collector, lifting between positive electrode active materials and the mesh-type current collector inevitably occurs such that the content of pores inside the positive electrode is increased, and thus there is a concern about a reduction in electrical connection between positive electrode active materials, an increase in resistance of the positive electrode, and a decrease in energy density.

The porosity of the positive electrode 20 may be realized by adjusting the use of the positive electrode active material and positive electrode current collector particles, the average particle diameter ($D_{50}$) and/or content of the positive electrode active material and positive electrode current collector particles, and the degree of rolling in the production of a lithium secondary battery.

In the specification, the porosity of the positive electrode may be calculated by the following Equation 1.

Porosity (%) of positive electrode={1−(True density of positive electrode/Electrode density of positive electrode)}×100   [Equation 1]

In Equation 1, the true density of the positive electrode is a density of a positive electrode active material layer which is measured when the positive electrode having been provided in a constant size is pressed using pressing equipment until the thickness of the positive electrode is not changed, and the electrode density of the positive electrode is a density of a positive electrode active material layer which is measured after the positive electrode is provided in a constant size.

The negative electrode 30 is formed in the other region inside the battery case 10 and includes a negative electrode active material and negative electrode current collector particles.

The negative electrode 30 may be formed in a region different from the region in which the positive electrode is formed, that is, in the other region inside the battery case 10 as shown in FIG. 1. In other words, the positive electrode 20 and the negative electrode 30 are formed in mutually different regions inside the battery case 10 while being separated by the separator 11.

As the negative electrode active material, any negative electrode active material commonly used in the art may be used without limitation, and, for example, a compound enabling the reversible intercalation and deintercalation of lithium may be used. Specific examples of the negative electrode active material include a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ (0<β<2), $SnO_2$, vanadium oxide, or lithium vanadium oxide; or a composite including the metallic compound and the carbonaceous material, such as a Si—C composite or a Sn—C composite, which may be used alone or in combination of two or more thereof. In addition, as the negative electrode active material, a lithium metal thin film may be used. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The negative electrode active material may be included at 80 wt % to 98 wt %, preferably 82 wt % to 94 wt %, and more preferably 87 wt % to 91 wt % in the negative electrode 30. It is preferable that the content of the negative electrode active material is within the above-described range in that energy density and output characteristics can be improved.

The negative electrode active material may have an average particle diameter ($D_{50}$) of 10 μm to 25 μm, and preferably, 15 μm to 20 μm. It is preferable that the average particle diameter of the negative electrode active material is within the above-described range in that rolling density can be increased to improve energy density and in view of increasing contact with negative electrode current collector particles to be described below or reducing a distance between the negative electrode active material and negative electrode current collector particles.

The negative electrode current collector particles may impart a significant effect of simplifying a battery production process and improving the output and capacity characteristics of the battery, like the above-described positive electrode current collector particles.

The negative electrode current collector particles may include at least one selected from the group consisting of aluminum, copper, stainless steel, nickel, and titanium and preferably include copper in view of improving the stability of the battery in consideration of the oxidation potential of the negative electrode active material.

The negative electrode current collector particles may have an average particle diameter ($D_{50}$) of 0.5 μm to 3 μm, and preferably, 1 μm to 2.5 μm. It is preferable that the average particle diameter of the negative electrode current collector particles is within the above-described range in view of increasing the surface area of the negative electrode current collector in contact with the negative electrode active material and improving rolling density in the mixing of the negative electrode current collector particles with negative electrode active material particles.

The negative electrode current collector particles may be included at 1 wt % to 15 wt %, preferably 1.5 wt % to 13 wt %, and more preferably 4 wt % to 8 wt % in the negative electrode 30. It is preferable that the content of the negative electrode current collector particles is within the above-described range in that a distance between the active material and the current collector can be maintained at a proper level to improve the output characteristics of the battery and simultaneously achieve high energy density of the negative electrode active material.

The negative electrode current collector particles may have at least one selected from the group consisting of a spherical shape, a fibrous shape, and a platy shape, preferably at least one selected from the group consisting of a spherical shape and a fibrous shape, and more preferably a spherical shape in view of increasing the surface area of the negative electrode current collector particles in contact with the negative electrode active material.

The positive electrode 20 and the negative electrode 30 may each independently further include at least one additive selected from the group consisting of a binder and a conductive material and preferably include a conductive material in view of improving conductivity.

The conductive material is used to improve the conductivity of the electrode, and any conductive material may be used without limitation as long as it does not cause a chemical change in the produced battery and has electron conductivity. Specific examples of the conductive material include graphite such as natural graphite, artificial graphite, or the like; a carbon-based material such as carbon black, acetylene black, Ketjen black, channel black, furnace black, lamp black, thermal black, a carbon fiber, or the like; a metal powder or metal fiber containing copper, nickel, aluminum, silver, or the like; a conductive whisker consisting of zinc oxide, potassium titanate, or the like; a conductive metal oxide such as titanium oxide or the like; and a conductive polymer such as a polyphenylene derivative or the like, which may be used alone or in combination of two or more thereof. The conductive material may be commonly included at 1 to 10 wt %, and preferably, 3 to 8 wt % in the positive electrode 20 or the negative electrode 30.

The binder may serve to improve the cohesion between active material particles and the adhesion between active material and current collector particles. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated-EPDM, styrene butadiene rubber (SBR), fluorine rubber, various copolymers thereof, and the like, which may be used alone or in combination of two or more thereof. The binder may be included at 1 to 10 wt %, and preferably, 3 to 8 wt % in the positive electrode 20 or the negative electrode 30.

The negative electrode 30 may have a porosity of 25% to 35%, preferably 27% to 33%, and more preferably 29.5% to 30.5%. By including the current collector in the form of particles, the negative electrode 30 may have the above-described level of porosity. Accordingly, the negative electrode active material and negative electrode current collector particles may be packed to a superior level, and pores inside the negative electrode may be reduced, thereby improving electrical connection between negative electrode active materials. When the negative electrode includes a current collector in the form of a mesh rather than particles as the negative electrode current collector, lifting between negative electrode active materials and the mesh-type current collector inevitably occurs such that the content of pores inside the negative electrode is increased, and thus there is a concern about a reduction in electrical connection between negative electrode active materials, an increase in resistance of the negative electrode, and a decrease in energy density.

The porosity of the negative electrode 30 may be realized by adjusting the use of the negative electrode active material and negative electrode current collector particles, the average particle diameter ($D_{50}$) and/or content of the negative electrode active material and negative electrode current collector particles, and the degree of rolling in the production of a lithium secondary battery.

In the specification the porosity of the negative electrode may be calculated by the following Equation 2.

Porosity (%) of negative electrode={1−(True density of negative electrode/Electrode density of negative electrode)}×100     [Equation 2]

In Equation 2, the true density of the negative electrode is a density of a negative electrode active material layer which is measured when the negative electrode having been provided in a constant size is pressed using pressing equipment until the thickness of the negative electrode is not changed, and the electrode density of the negative electrode is a density of a negative electrode active material layer which is measured after the negative electrode is provided in a constant size.

The lithium secondary battery of the present invention may further include an electrolyte.

Examples of the electrolyte used in the present invention include an organic liquid electrolyte, an inorganic liquid electrolyte, a solid polymer electrolyte, a gel-type polymer electrolyte, an inorganic solid electrolyte, a molten-type inorganic electrolyte, and the like that are usable in the production of a lithium secondary battery, but the present invention is not limited thereto.

Specifically, the electrolyte may include an organic solvent and a lithium salt.

As the organic solvent, any organic solvent may be used without particular limitation as long as it may serve as a medium through which ions involved in an electrochemical reaction of the battery can migrate. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte solution performance may be exhibited.

As the lithium salt, any compound may be used without particular limitation as long as it may provide lithium ions used in the lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. The additive may be included at 0.1 to 5 wt % with respect to the total weight of the electrolyte.

In addition, the present invention provides a battery module including the lithium secondary battery as a unit cell and a battery pack including the battery module.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

<Method of Producing Lithium Secondary Battery>

In addition, the present invention provides a method of producing a lithium secondary battery. The method of producing a lithium secondary battery may be a method of producing the above-described lithium secondary battery.

Specifically, the method of producing a lithium secondary battery of the present invention includes: providing a battery case whose inside is divided into one region and the other region by a separator; preparing a first mixture including a positive electrode active material and positive electrode current collector particles and preparing a second mixture including a negative electrode active material and negative electrode current collector particles; injecting the first mixture into one region inside the battery case and injecting the second mixture into the other region inside the battery case; and rolling the battery case into which the first mixture and the second mixture have been injected while applying pressure.

According to the method of producing a lithium secondary battery of the present invention, a process of mixing current collector particles (positive electrode current collector particles or negative electrode current collector particles) rather than the conventional plate-type current collector layer with an electrode active material (positive electrode active material or negative electrode active material) and then injecting the resulting mixture into a battery case is carried out. That is, since the conventional process of applying an electrode active material onto an electrode current collector layer is not carried out, a battery production process may be simplified.

In addition, according to the method of producing a lithium secondary battery of the present invention, since a positive electrode and a negative electrode may be produced integrally in a battery case, a process of producing a positive electrode and a negative electrode as separate units and then assembling the units is not required. Accordingly, the method of producing a lithium secondary battery of the present invention may allow a battery production process to be simplified and productivity to be improved.

Additionally, according to the method of producing a lithium secondary battery of the present invention, a battery in which current collector particles are distributed among electrode active materials may be produced, and accordingly, the conventional problem such as output reduction caused by an increase in distance between a current collector layer and the top of an electrode active material layer may be solved.

In addition, according to the method of producing a lithium secondary battery of the present invention, since a current collector in the form of particles is used instead of the conventional current collector layer, an electrode having high capacity and high energy density based on the same thickness, as compared with the conventional electrode produced by a coating method, may be produced.

Figure 2:
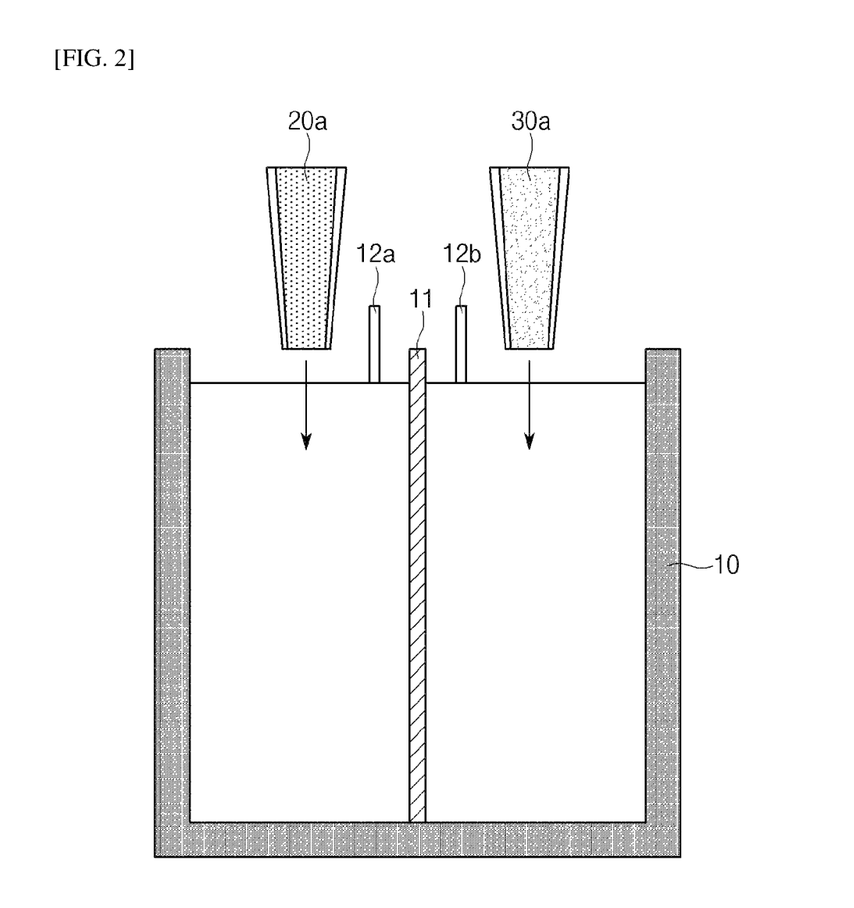
FIG. 2 is a schematic diagram for describing a method of producing a lithium secondary battery of the present invention.
Figure 3:
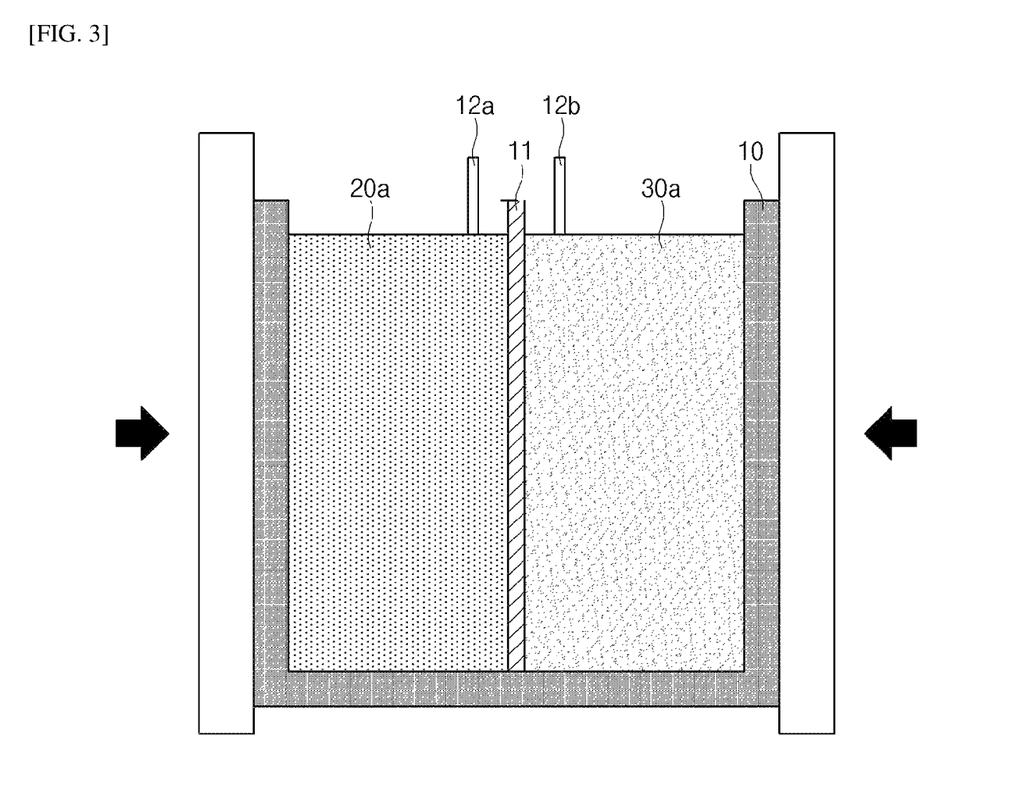
FIG. 3 is a schematic diagram for describing a method of producing a lithium secondary battery of the present invention.

FIG. 2 and FIG. 3 are schematic diagrams for describing the method of producing a lithium secondary battery of the present invention.

Referring to FIG. 2, the method of producing a lithium secondary battery according to the present invention includes providing a battery case 10 whose inside is divided into one region and the other region by a separator 11.

Details about the battery case 10 and the separator 11 have been described above.

The method of producing a lithium secondary battery of the present invention includes preparing a first mixture 20a including a positive electrode active material and positive electrode current collector particles and preparing a second mixture 30a including a negative electrode active material and negative electrode current collector particles.

The first mixture 20a may be injected into one region inside the battery case 10, as shown in FIG. 2, and may be subjected to a process such as a rolling process and the like to form a positive electrode.

The first mixture 20a includes a positive electrode active material and positive electrode current collector particles.

The positive electrode active material may be included at 80 wt % to 98 wt %, preferably 82 wt % to 94 wt %, and more preferably 87 wt % to 91 wt % in the first mixture 20a. It is preferable that the content of the positive electrode active material is within the above-described range in view of improving energy density and output characteristics.

The positive electrode current collector particles may be included at 1 wt % to 15 wt %, preferably 1.5 wt % to 13 wt %, and more preferably 4 wt % to 8 wt % in the first mixture 20a. It is preferable that the content of the positive electrode current collector particles is within the above-described range in that a distance between the active material and the current collector can be maintained at a proper level to improve the output characteristics of the battery and simultaneously achieve high energy density of the positive electrode active material.

Other details about the positive electrode active material and the positive electrode current collector particles are the same as those described above.

The second mixture 30a may be injected into a region different from the region into which the first mixture 20a is injected, that is, the other region inside the battery case 10, as shown in FIG. 2, and may be subjected to a process such as a rolling process and the like to form a negative electrode. That is, the first mixture 20a and the second mixture 30a are injected into mutually different regions inside the battery case 10 while being separated by the separator 11.

The second mixture 30a includes a negative electrode active material and negative electrode current collector particles.

The negative electrode active material may be included at 80 wt % to 98 wt %, preferably 82 wt % to 94 wt %, and more preferably 87 wt % to 91 wt % in the second mixture 30a. It is preferable that the content of the negative electrode active material is within the above-described range in view of improving energy density and output characteristics.

The negative electrode current collector particles may be included at 1 wt % to 15 wt %, preferably 1.5 wt % to 13 wt %, and more preferably 4 wt % to 8 wt % in the second mixture 30a. It is preferable that the content of the negative electrode current collector particles is within the above-described range in that a distance between the active material and the current collector can be maintained at a proper level to improve the output characteristics of the battery and simultaneously achieve high energy density of the negative electrode active material.

Other details about the negative electrode active material and the negative electrode current collector particles are the same as those described above.

The first mixture 20a and the second mixture 30a may each independently further include at least one additive selected from the group consisting of a binder and a conductive material and preferably include a conductive material in view of improving conductivity.

The conductive material may be included at 1 to 10 wt %, and preferably, 3 to 8 wt % with respect to the total weight of the first mixture 20a or the second mixture 30a. Other details about the conductive material are the same as those described above.

The binder may be included at 1 to 10 wt %, and preferably, 3 to 8 wt % with respect to the total weight of the first mixture 20a or the second mixture 30a. Other details about the binder are the same as those described above.

The method of producing a lithium secondary battery of the present invention includes injecting the first mixture 20a into one region inside the battery case 10 and injecting the second mixture 30a into the other region inside the battery case 10, as shown in FIG. 2.

The injection of the first mixture 20a and the injection of the second mixture 30a may be carried out simultaneously or separately.

During the injection of the first mixture 20a and the second mixture 30a, a process of subjecting the battery case 10 to vibration may be further carried out. As a result, the first mixture 20a and the second mixture 30a may be smoothly injected into the inside of the battery case 10, and pores inside the mixture may be reduced by vibration applied during the injection, thereby it is possible to achieve high energy density and high capacity.

The vibration process may be carried out by subjecting the battery case to vibration at a frequency of 15 to 45 Hz, and preferably, 20 to 35 Hz in view of smoothly injecting into the battery case and achieving high energy density.

The first mixture 20a and the second mixture 30a may each be independently injected in the form of a slurry or powder into the battery case 10. Preferably, the first mixture 20a and the second mixture 30a are injected in the form of powder into the battery case 10, which is preferred in that a time of a drying process to be described below can be reduced compared to when they are injected in the form of a slurry, and a rolling process and a drying process can be simultaneously carried out to promote the simplification of the process. In particular, when the first mixture 20a and the second mixture 30a are injected in the form of powder into the battery case 10, a binder for the cohesion of electrode active materials may not be separately required, and thus an increase in resistance of the electrode caused by using a binder may be prevented.

In the case of the first mixture 20a and the second mixture 30a in the form of powder, the first mixture 20a and the second mixture 30a may not further include a solvent. Specifically, in the case of the first mixture 20a and the second mixture 30a in the form of powder, the first mixture 20a may consist of a positive electrode active material, positive electrode current collector particles, and, optionally, at least one additive selected from the group consisting of a binder and a conductive material, and the second mixture 30a may consist of a negative electrode active material, negative electrode current collector particles, and, optionally, at least one additive selected from the group consisting of a binder and a conductive material.

In the case of the first mixture 20a and the second mixture 30a in the form of a slurry, the first mixture 20a and the second mixture 30a may further include a solvent in addition to the electrode active material (positive electrode active material or negative electrode active material), the electrode current collector particles (positive electrode current collector particles or negative electrode current collector particles), and, optionally, at least one additive selected from the group consisting of a binder and a conductive material.

The solvent may include at least one selected from the group consisting of water and N-methyl-2-pyrrolidone (NMP). The solvent may be included in the first mixture 20a or the second mixture 30a in such a way that the concentration of a solid including the electrode active material (positive electrode active material or negative electrode active material), the electrode current collector particles (positive electrode current collector particles or negative electrode current collector particles), and, optionally, at least one additive selected from the group consisting of a binder and a conductive material becomes 50 wt % to 95 wt %, and preferably, 70 wt % to 90 wt %.

The method of producing a lithium secondary battery of the present invention includes rolling the battery case 10 into which the first mixture 20a and the second mixture 30a have been injected while applying pressure.

As shown in FIG. 3, after the first mixture 20a and the second mixture 30a are injected into the battery case 10, the battery case 10 may be subjected to a rolling process while applying pressure with a means for applying pressure or the like. Through the rolling process, pores inside the battery case 10 may be removed, and one region and the other region inside the battery case 10 take shape as a positive electrode and a negative electrode, respectively, by pressing the battery case that is likely to be expanded due to the injection of the electrode active material. In addition, through the rolling process, the positive electrode and the negative electrode may be in close contact with each other while being separated by the separator, and accordingly, lithium ions may be smoothly exchanged.

In addition, the method of producing a lithium secondary battery of the present invention is preferred because, since through the above-mentioned rolling process it is possible to simultaneously produce the positive electrode and the negative electrode without needing to separately produce them, a battery production process may be simplified.

The pressure applied during the rolling may be 400 kgf/cm² to 600 kg f/cm², and preferably, and 450 kgf/cm² to 550 kgf/cm². When the pressure is within the above-described range, a battery having high energy density can be produced without damaging the electrode active material.

The rolling process may be carried out for 2 seconds to 60 seconds, preferably 3 seconds to 30 seconds, and more preferably 5 seconds to 10 seconds, which is preferred in that the rolling process can be smoothly carried out without damaging the electrode active material.

The method of producing a lithium secondary battery of the present invention may further include drying the battery case 10 into which the first mixture 20a and the second mixture 30a have been injected. Specifically, the first mixture 20a and the second mixture 30a may be dried by applying heat to the inside of the battery case 10 into which the first mixture 20a and the second mixture 30a have been injected.

The drying may be carried out at 65° C. to 90° C., and preferably, 75° C. to 85° C.

The drying may be carried out prior to or simultaneously with the rolling. In particular, it is preferable that the rolling and the drying are simultaneously carried out in that the process can be further simplified.

Specifically, when the first mixture 20a and the second mixture 30a in the form of powder are injected into the battery case 10, the drying may be carried out prior to or simultaneously with the rolling and is preferably carried out simultaneously with the rolling. That is, when the first mixture 20a and the second mixture 30a in the form of powder are injected, a time required for the drying can be reduced, and thus the drying and the rolling may be simultaneously completed. Specifically, when the first mixture 20a and the second mixture 30a in the form of powder are injected, the drying may be carried out for 2 seconds to 60 seconds, preferably 3 seconds to 30 seconds, and more preferably 5 seconds to 10 seconds.

Meanwhile, when the first mixture 20a and the second mixture 30a in the form of a slurry are injected into the battery case 10, the drying may be carried out prior to the rolling in view of ensuring a sufficient drying time. Specifically, when the first mixture 20a and the second mixture 30a in the form of a slurry are injected, the drying may be carried out for 5 minutes to 30 minutes, and preferably, 7 minutes to 15 minutes in order to sufficiently dry the first mixture 20a and the second mixture 30a.

The method of producing a lithium secondary battery of the present invention may further include injecting an electrolyte into the inside of the battery case 10 which has been rolled. Other details about the electrolyte have been described above.

The method of producing a lithium secondary battery of the present invention may further include sealing the battery case 10 into which the electrolyte has been injected.

Specifically, the sealing may include evacuating the inside of the battery case 10 into which the electrolyte has been injected, and accordingly, air bubbles or pores inside the battery case 10 may be effectively removed to improve energy density.

Hereinafter, the present invention will be described in detail with reference to Examples so that those skilled in the art can easily carry out the present invention. However, the present invention may be embodied in several different forms, and therefore, is not limited to Examples described herein.

EXAMPLES

Example 1: Production of Lithium Secondary Battery

An aluminum pouch-type battery case was provided. A polypropylene separator (thickness 15 μm) was formed in the battery case to separate one region and the other region inside the battery case.

$LiNi_{0.8}Co_{0.1}Mn_{0.1}O_2$ (average particle diameter ($D_{50}$): 12 μm) as a positive electrode active material, spherical aluminum particles (average particle diameter ($D_{50}$): 2 μm) as positive electrode current collector particles, and acetylene black as a conductive material were mixed in a weight ratio of 90:5:5 to prepare a first mixture in the form of powder.

Artificial graphite (average particle diameter ($D_{50}$): 18 μm) as a negative electrode active material, copper particles (average particle diameter ($D_{50}$): 2 μm) as negative electrode current collector particles, and acetylene black as a conductive material were mixed in a weight ratio of 90:5:5 to prepare a second mixture in the form of powder.

The first mixture and the second mixture were injected into one region and the other region inside the battery case, respectively. During the injection, the battery case was subjected to vibration at a frequency of 30 Hz.

After the injection of the first mixture and the second mixture, the battery case was rolled and simultaneously dried to produce a positive electrode and a negative electrode. The rolling was carried out at a surface pressure of 500 kgf/cm², the drying was carried out at 80° C., and the rolling and drying were carried out for 7 seconds.

Afterwards, an electrolyte was injected into the inside of the battery case, and the battery case was sealed by evacuating the inside of the case to produce a lithium secondary battery. The electrolyte was prepared by dissolving $LiPF_6$ in a solvent, which was prepared by mixing ethylene carbonate (EC), dimethyl carbonate (DMC), and ethyl methyl carbonate (EMC) in a volume ratio of 30:40:30, so that a $LiPF_6$ concentration became 1 M.

According to the lithium secondary battery thus produced, the positive electrode had a thickness of 130 µm, and the negative electrode had a thickness of 145 µm. In addition, the positive electrode had a porosity of 25%, and the negative electrode had a porosity of 30%.

Example 2: Production of Lithium Secondary Battery

A lithium secondary battery was produced in the same manner as in Example 1 except that a first mixture (in the form of powder), which was prepared by mixing $LiNi_{0.8}Co_{0.1}Mn_{0.1}O_2$ (average particle diameter ($D_{50}$): 12 µm) as a positive electrode active material, spherical aluminum particles (average particle diameter ($D_{50}$): 2 µm) as positive electrode current collector particles, and acetylene black as a conductive material in a weight ratio of 93:2:5, was used, and a second mixture (in the form of powder), which was prepared by mixing artificial graphite (average particle diameter ($D_{50}$): 18 µm) as a negative electrode active material, copper particles (average particle diameter ($D_{50}$): 2 µm) as negative electrode current collector particles, and acetylene black as a conductive material in a weight ratio of 93:2:5, was used.

In this case, the positive electrode had a porosity of 26%, and the negative electrode had a porosity of 31%.

Example 3: Production of Lithium Secondary Battery

A lithium secondary battery was produced in the same manner as in Example 1 except that a first mixture (in the form of powder), which was prepared by mixing $LiNi_{0.8}Co_{0.1}Mn_{0.1}O_2$ (average particle diameter ($D_{50}$): 12 µm) as a positive electrode active material, spherical aluminum particles (average particle diameter ($D_{50}$): 2 µm) as positive electrode current collector particles, and acetylene black as a conductive material in a weight ratio of 83:12:5, was used, and a second mixture (in the form of powder), which was prepared by mixing artificial graphite (average particle diameter ($D_{50}$): 18 µm) as a negative electrode active material, copper particles (average particle diameter ($D_{50}$): 2 µm) as negative electrode current collector particles, and acetylene black as a conductive material in a weight ratio of 83:12:5, was used.

In this case, the positive electrode had a porosity of 23%, and the negative electrode had a porosity of 29%.

Example 4: Production of Lithium Secondary Battery

A lithium secondary battery was produced in the same manner as in Example 1 except that, in the preparation of a first mixture, a positive electrode active material prepared by mixing $LiNi_{0.8}Co_{0.1}Mn_{0.1}O_2$ (average particle diameter ($D_{50}$): 14 µm) as a first positive electrode active material and $LiNi_{0.8}Co_{0.1}Mn_{0.1}O_2$ (average particle diameter ($D_{50}$): 4 µm) as a second positive electrode active material in a weight ratio of 80:20 was used.

In this case, the positive electrode had a porosity of 24%, and the negative electrode had a porosity of 29%.

Comparative Example 1: Production of Lithium Secondary Battery $LiNi_{0.8}Co_{0.1}Mn_{0.1}O_2$ (average particle diameter ($D_{50}$): 12 µm) as a positive electrode active material, acetylene black as a conductive material, and polyvinylidene fluoride (PVDF) as a binder were mixed in a weight ratio of 90:5:5 in an N-methylpyrrolidone solvent to prepare a positive electrode slurry, and the slurry was applied onto one surface of an aluminum current collector (thickness: 15 µm), dried at 130° C., and then rolled to produce a positive electrode. In this case, the positive electrode had a thickness of 130 µm.

Artificial graphite (average particle diameter ($D_{50}$): 18 µm) as a negative electrode active material, acetylene black as a conductive material, and PVDF as a binder were mixed in a weight ratio of 90:5:5 in an N-methylpyrrolidone solvent to prepare a negative electrode slurry, and the slurry was applied onto one surface of a copper current collector layer (thickness: 15 µm) layer, dried at 80° C., and then rolled to produce a negative electrode. In this case, the negative electrode had a thickness of 145 µm.

A polypropylene separator (thickness: 15 µm) was interposed between the produced positive electrode and negative electrode for a secondary battery to produce an electrode assembly, the electrode assembly was placed in an aluminum pouch-type battery case, and then an electrolyte was injected into the inside of the battery case to produce a lithium secondary battery. The electrolyte was prepared by dissolving $LiPF_6$ in a solvent, which was prepared by mixing EC, DMC, and EMC in a volume ratio of 30:40:30, so that a $LiPF_6$ concentration became 1 M.

In this case, the positive electrode had a porosity of 25%, and the negative electrode had a porosity of 30%.

Experimental Examples

Experimental Example 1: Evaluation of Output Characteristics

The output characteristics of the lithium secondary batteries produced in Examples 1 to 4 and Comparative Example 1 were evaluated. According to the evaluation of output characteristics, the lithium secondary batteries of Examples 1 to 4 and Comparative Example 1 were charged (0.2C CC/CV charging 4.2 V 0.05 C cut), allowed to rest for 10 minutes, and discharged (0.2C CC discharging 2.5 V cut).

In this case, the variation between the voltage measured during the rest and the voltage measured at 60 seconds after the start of discharge was divided by current variation to calculate resistance (DCIR), and results thereof are shown in the following Table 1.

TABLE 1

|  | Example 1 | Example 2 | Example 3 | Example 4 | Comparative Example 1 |
|---|---|---|---|---|---|
| DCIR ($\Omega$) | 24 | 29 | 25 | 21 | 42 |

Referring to Table 1, in the case of the lithium secondary batteries of Examples 1 to 4, it was evaluated that, since a current collector in the form of particles was used, current collector particles were uniformly distributed among electrode active materials, resulting in low resistance and excellent output characteristics.

On the other hand, in the case of the lithium secondary battery of Comparative Example 1, it can be seen that, since a current collector layer was provided at the bottom of the positive electrode or negative electrode, a distance between an electrode active material present at the top of an electrode active material layer and a current collector layer is increased, resulting in degraded output characteristics.

Experimental Example 2: Evaluation of Capacity Characteristics

The lithium secondary batteries produced in Examples 1 to 4 and Comparative Example 1 were initially charged (0.2C CC/CV charging 4.2 V/0.05 C cut) and discharged (0.2C CC discharging 2.5 V cut), and then the discharge capacities thereof were evaluated.

Results thereof are shown in the following Table 2.

TABLE 2

|  | Example 1 | Example 2 | Example 3 | Example 4 | Comparative Example 1 |
|---|---|---|---|---|---|
| Discharge capacity (mAh/g) | 204 | 198 | 202 | 206 | 194 |

Referring to Table 2, it can be seen that Examples 1 to 4, in which a current collector in the form of particles was used, achieved high capacity based on the same thickness, as compared with Comparative Example 1 in which a current collector in the form of a plate was used.

[List of Reference Numerals]

| 10: battery case | 11: separator |
| 12a: positive electrode tab | 12b: negative electrode tab |
| 20: positive electrode | 20a: first mixture |
| 30: negative electrode | 30a: second mixture |

The invention claimed is:

1. A lithium secondary battery comprising:
a battery case having an interior region;
a separator, wherein the separator divides the interior region into a first region and a second region and is configured to be connected to the battery case;
a positive electrode formed in the first region and including a positive electrode active material and positive electrode current collector particles; and
a negative electrode formed in the second region and including a negative electrode active material and negative electrode current collector particles.

2. The lithium secondary battery of claim 1, wherein the positive electrode has a porosity of 20% to 30%.

3. The lithium secondary battery of claim 1, wherein the negative electrode has a porosity of 25% to 35%.

4. The lithium secondary battery of claim 1, wherein the positive electrode current collector particles are present at 1 wt % to 15 wt %, relative to the total weight of the positive electrode, and
wherein the negative electrode current collector particles are present at 1 wt % to 15 wt %, relative to the total weight of the negative electrode.

5. The lithium secondary battery of claim 1, wherein the positive electrode current collector particles and the negative electrode current collector particles each independently have an average particle diameter ($D_{50}$) of 0.5 μm to 3 μm.

6. The lithium secondary battery of claim 1, wherein the positive electrode current collector particles and the negative electrode current collector particles each independently include at least one selected from the group consisting of aluminum, copper, stainless steel, nickel, and titanium.

7. The lithium secondary battery of claim 1, wherein the positive electrode active material includes a first positive electrode active material and a second positive electrode active material,
wherein the first positive electrode active material has a larger average particle diameter ($D_{50}$) than the second positive electrode active material.

8. The lithium secondary battery of claim 7, wherein the first positive electrode active material has an average particle diameter ($D_{50}$) of 10 μm to 18 μm, and the second positive electrode active material has an average particle diameter ($D_{50}$) of 2 μm to 8 μm.

9. A method of producing the lithium secondary battery of claim 1, comprising:
injecting a first mixture into a first region of a battery case and injecting a second mixture into a second region of the battery case, wherein the first region and second region are part of an interior region of the battery case, wherein a separator separates the first region from the second region, wherein the first mixture includes a positive electrode active material and positive electrode current collector particles, and wherein the second mixture includes a negative electrode active material and negative electrode current collector particles; and
after the injection of the first and second mixtures, rolling the battery case while applying pressure.

10. The method of claim 9, wherein the first mixture and the second mixture are each independently injected in the form of a slurry or powder into the battery case.

11. The method of claim 9, further comprising:
during the injection of the first mixture and the second mixture, vibrating the battery case.

12. The method of claim 9, further comprising:
after the injection of the first and second mixtures, drying the battery case.

13. The method of claim 12, wherein the drying of the battery case occurs prior to or simultaneously with the rolling.

14. The method of claim 9, further comprising injecting an electrolyte into the interior region of the battery case after the battery case has been rolled.

15. The method of claim 14, further comprising:
after the injection of the electrolyte, sealing the battery case by evacuating air bubbles from the interior region of the battery case.

* * * * *